United States Patent
Sun et al.

(10) Patent No.: US 12,141,496 B2
(45) Date of Patent: Nov. 12, 2024

(54) OPTICAL ELEMENT WITH SOUND FUNCTION AND DISPLAY DEVICE USING SAME

(71) Applicants: LG DISPLAY CO., LTD., Seoul (KR); SEOUL NATIONAL UNIVERSITY R&DB FOUNDATION, Seoul (KR)

(72) Inventors: Jeong Yun Sun, Seoul (KR); Jeong Min Moon, Paju-si (KR); Su Seok Choi, Paju-si (KR); Sungpil Ryu, Paju-si (KR); Jihwan Jung, Paju-si (KR); Kiseok Chang, Paju-si (KR); Do Yoon Kim, Seongnam-si (KR); Hyesung Cho, Suwon-si (KR)

(73) Assignees: LG Display Co., Ltd., Seoul (KR); Seoul National University R&DB Foundation, Seoul (KR)

( * ) Notice: Subject to any disclaimer, the term of this patent is extended or adjusted under 35 U.S.C. 154(b) by 702 days.

(21) Appl. No.: 17/055,105

(22) PCT Filed: May 14, 2019

(86) PCT No.: PCT/KR2019/005799
§ 371 (c)(1),
(2) Date: Nov. 12, 2020

(87) PCT Pub. No.: WO2019/221492
PCT Pub. Date: Nov. 21, 2019

(65) Prior Publication Data
US 2021/0124551 A1  Apr. 29, 2021

(30) Foreign Application Priority Data
May 14, 2018 (KR) .................... 10-2018-0054830

(51) Int. Cl.
*G06F 3/16* (2006.01)
*G02B 1/00* (2006.01)
(Continued)

(52) U.S. Cl.
CPC ............... *G06F 3/16* (2013.01); *G02B 1/005* (2013.01); *G06F 1/1605* (2013.01); *G10K 9/12* (2013.01)

(58) Field of Classification Search
CPC ............................. G02B 1/005; G06F 1/1605
(Continued)

(56) References Cited

U.S. PATENT DOCUMENTS 4,810,599 A * 3/1989 Kondo .................. H01M 4/621
429/212
6,791,519 B2 9/2004 Aarts et al.
(Continued)

FOREIGN PATENT DOCUMENTS

CN  103226273 A  7/2013
CN  103843365 A  6/2014
(Continued)

OTHER PUBLICATIONS

PCT International Search Report and Written Opinion, PCT Application No. PCT/KR2019/005799, Aug. 29, 2019, 10 pages (with English translation of International Search Report).
(Continued)

*Primary Examiner* — George C Monikang
(74) *Attorney, Agent, or Firm* — Fenwick & West LLP (57) ABSTRACT

The present invention relates to an optical element capable of simultaneously outputting sound from the surface of a display device with an image, the optical element comprising: a first electrode member; a first dielectric elastomer layer disposed on the first electrode member; a second electrode member disposed on the first dielectric elastomer
(Continued)

layer; and an optical crystal layer disposed on the second electrode member. Accordingly, in the present invention, image and sound are implemented simultaneously, and thus, it is possible to prevent defects due to mismatching of the image and the sound, and a separate sound system is not required when the display device is manufactured using the optical element, thereby making it possible to reduce components of an electronic product including the display device and reduce the manufacturing cost.

16 Claims, 10 Drawing Sheets

(51) Int. Cl.
*G06F 1/16* (2006.01)
*G10K 9/12* (2006.01)

(58) Field of Classification Search
USPC .............................................................. 359/7
See application file for complete search history.

(56) References Cited

U.S. PATENT DOCUMENTS

| | | | |
|---|---|---|---|
| 7,903,091 | B2 | 3/2011 | Lee et al. |
| 9,030,386 | B2 | 5/2015 | Park |
| 9,761,784 | B2 | 9/2017 | Miyoshi |
| 2002/0171636 | A1 | 11/2002 | Aarts et al. |
| 2005/0116625 | A1* | 6/2005 | Park ................ H10K 59/879 |
| | | | 313/506 |
| 2007/0046642 | A1 | 3/2007 | Lee et al. |
| 2007/0084460 | A1* | 4/2007 | Beckman ............. F24S 70/225 |
| | | | 126/625 |
| 2011/0109870 | A1* | 5/2011 | Tang .................... G02F 1/1326 |
| | | | 349/201 |
| 2012/0082332 | A1 | 4/2012 | Park |
| 2014/0198373 | A1 | 7/2014 | Ray |
| 2014/0210309 | A1 | 7/2014 | Miyoshi |
| 2015/0131238 | A1* | 5/2015 | Lee ....................... G09G 3/035 |
| | | | 361/750 |
| 2016/0178949 | A1* | 6/2016 | Wang ................ G02F 1/134309 |
| | | | 345/173 |

FOREIGN PATENT DOCUMENTS

| | | | |
|---|---|---|---|
| CN | 104882071 | * | 9/2015 |
| KR | 10-2003-0007805 A | | 1/2003 |
| KR | 10-0887337 B1 | | 3/2009 |
| KR | 10-1060643 B1 | | 8/2011 |
| KR | 10-2012-0055179 A | | 5/2012 |
| KR | 10-1146530 B1 | | 5/2012 |
| KR | 10-2017-0124001 A | | 11/2017 |
| WO | WO 2011/089919 A1 | | 7/2011 |

OTHER PUBLICATIONS

Korean Intellectual Property Office, Office Action, KR Patent Application No. 10-2018-0054830, Oct. 21, 2022, 13 pages.
China National Intellectual Property Office, Office Action, Chinese Patent Application No. 201980028164.6, Aug. 29, 2023, 14 pages.
Korean Intellectual Property Office, Office Action, Korean Patent Application No. 10-2018-0054830, Jun. 1, 2023, nine pages.

* cited by examiner

OPTICAL ELEMENT WITH SOUND FUNCTION AND DISPLAY DEVICE USING SAME

FIELD

The present disclosure relates to an optical device capable of outputting sound and a display device using the same.

RELATED ART

Recently, various types of display devices have been provided. In particular, not only thinner and larger display devices, but also flexible display devices have been developed. Thus, the display devices are being applied to various fields.

Further, a sound system using a display device as an audio-visual device is also manufactured together with development of the display device. Thus, vivid sound close to an original sound is provided to a user in a matching manner with an image on the display device.

However, in such as conventional audio-visual device, the display device and the sound system are separated from each other, and, thus, the image and the sound may not accurately match with each other.

Further, a speaker of the sound system of the conventional audio-visual device is a point sound source. Thus, there is a limitation in outputting the sound in accurate association with movement of the image. In other words, there is a limitation in implementing stereo sound associated with the image.

Moreover, in the conventional audio-visual device, the display device and the sound system are separated from each other, such that an entire volume of the audio-visual device increases and a manufacturing cost thereof increases.

DISCLOSURE

Technical Purposes

The present disclosure has been made in view of the above problems. Thus, a purpose of the present disclosure is to provide an optical device capable of simultaneously outputting an image and sound from a surface of a display device, and the display device using the optical device.

Technical Solutions

In order to achieve the above purpose, an optical device according to the present disclosure includes a first electrode member, a first dielectric elastomer layer disposed on the first electrode member, a second electrode member disposed on the first dielectric elastomer layer, and a photonic crystal layer disposed on the second electrode member.

The first electrode member includes at least one of a first conductive layer or a first electrode, and the second electrode member includes at least one of a second conductive layer or a second electrode.

Each of the first conductive layer and the second conductive layer is composed of an elastomer or a conductive polymer and electrolyte contained in the elastomer or the conductive polymer, and each of the first electrode and the second electrode is made of transparent metal oxide or metal.

Each of the first dielectric elastomer layer and the second dielectric elastomer layer is composed of at least one selected from a group consisting of silicone rubber, acrylonitrile-butadiene rubber (NBR), hydrogenated acrylonitrile butadiene rubber (H-NBR), ethylene propylene diene rubber (EPDM), acrylic rubber, urethane rubber, epichlorohydrin rubber, chlorosulfonated polyethylene, chlorinated polyethylene, and compounds thereof.

The photonic crystal layer may be composed of a polymer material in a form of a gel and beads filled in the polymer material. Alternatively, the photonic crystal layer may be composed of a material having dielectric and elasticity and beads filled in the dielectric and elastic material.

The first electrode member, the first dielectric elastomer layer and the second electrode member output sound while the photonic crystal layer reflects light to display an image. One frame of a signal applied to the first electrode member and the second electrode member is composed of a first field including sound information and a second field including image information. In this connection, the first field is alternating current voltage and the second field is direct current voltage.

Further, the display device according to the present disclosure includes a plurality of pixels, a thin film transistor disposed in each of the plurality of pixels, and the optical device disposed in each of the plurality of pixels.

Technical Effects

In the optical device according to the present disclosure, a sound member and an optical member are stacked vertically. The sound information and the image information are included in the signal of one frame. Thus, a target color (or image) may be displayed on a surface of one optical device, while sound is output from the surface of the optical device. Therefore, the image and the sound are simultaneously outputted, thereby to prevent defects due to the mismatch between the image and the sound.

Further, the optical device according to the present disclosure does not have a sound system separate from the optical device to output the sound. Thus, when the display device is manufactured using the optical device, the separate sound system is not required, thereby to reduce the number of parts of an electronic product including the display device and to reduce a manufacturing cost thereof.

Moreover, when applying the optical device according to the present disclosure to the display device, the sound is not output from a point sound source but is output across an entire screen of the display device, such that true stereo sound may be realized.

DETAILED DESCRIPTIONS

Advantages and features of the present disclosure, and methods for achieving them will be clarified with reference to embodiments described below in detail together with the accompanying drawings. However, the present disclosure is not limited to the embodiments disclosed below, but will be implemented in various different forms. The embodiments are set forth to allow the present disclosure to be complete, and completely to inform the skilled person to the art of a scope of the present disclosure. The present disclosure is only defined by a scope of the claims.

Shapes, sizes, scales, angles, numbers, etc. disclosed in the drawings for describing the embodiments of the present disclosure are exemplary. The present disclosure is not limited to those as illustrated in the drawings. The same reference numerals refer to the same components throughout the specification. Well-known methods, procedures, components, and circuits have not been described in detail so as not to unnecessarily obscure aspects of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

In interpreting numerical values, the numerical value includes an error range even when no explicit description thereof is present.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

Regarding a temporal relationship, for example, when a first event occurs after, before, subsequently to or previously to a second event, a third event may occur between the first event and the second event unless the first event occurs directly after, before, subsequently to or previously to the second event.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Features of various embodiments of the present disclosure may be at least partially combined with each other, and may be associated with each other. The embodiments may be implemented independently of each other or in a combined manner.

Hereinafter, the present disclosure will be described in detail with reference to the accompanying drawings.

Figure 1:
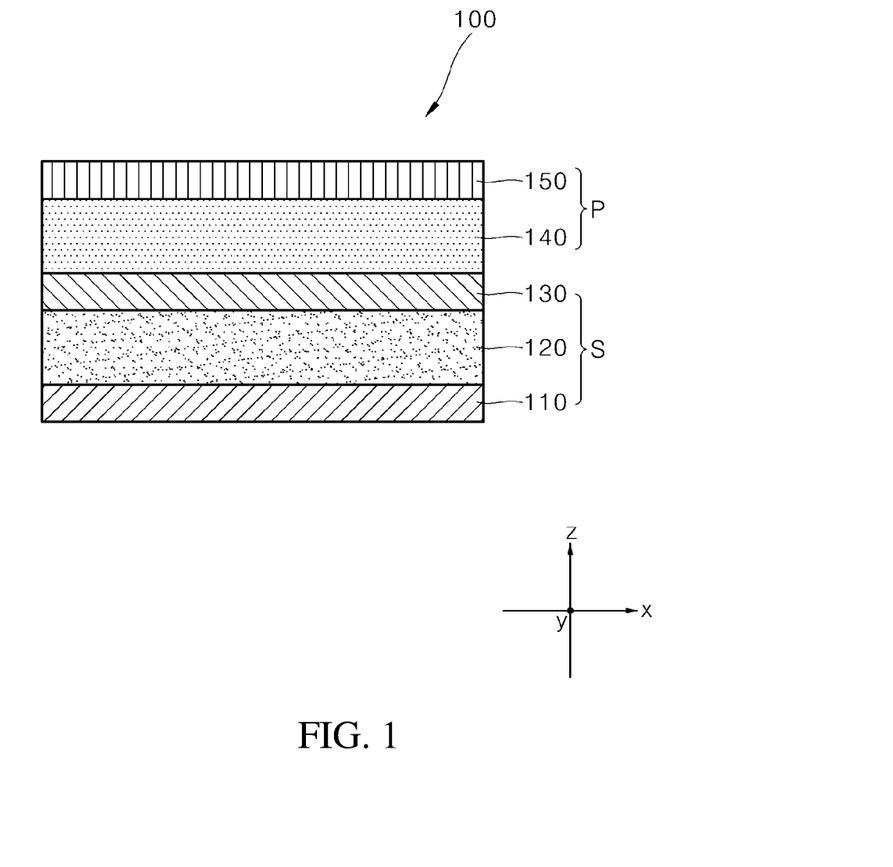
FIG. 1 is a view showing a structure of an optical device according to a first embodiment of the present disclosure.

FIG. 1 is a view showing a structure of an optical device having a sound function according to a first embodiment of the present disclosure.

As shown in FIG. 1, an optical device according to the first embodiment of the present disclosure include a first conductive layer 110, a second conductive layer 130, a first dielectric elastomer layer 120 disposed between the first conductive layer 110 and the second conductive layer 130, a second dielectric elastomer layer 140 disposed on the second conductive layer 130, and a photonic crystal layer 150 disposed on the second dielectric elastomer layer 140.

The first conductive layer 110, the second conductive layer 130 and the first dielectric elastomer layer 120 constitute a sound member S, while the second dielectric elastomer layer 140 and the photonic crystal layer 150 constitute an optical member P.

Each of the first conductive layer 110 and the second conductive layer 130 is made of a transparent material having low sheet resistance and activated at high voltage and high frequency and capable of fully transmitting light having a wavelength corresponding to a visible light region. Each of the first conductive layer 110 and the second conductive layer 130 may be composed of a crosslinked three-dimensional polymer containing therein a large amount of electrolyte. The three-dimensional polymer is an elastomer or conductive polymer and is transparent and has high elasticity. In this connection, the elastomer or conductive polymer has an electrolyte dispersed therein. Further, each of the first conductive layer 110 and the second conductive layer 130 may be composed only of a conductive ionic liquid and has high flexibility.

The electrolyte contained in each of the first conductive layer 110 and the second conductive layer 130 includes a transparent medium capable of transporting ions. A water-soluble salt solution such as NaCl may be used as the electrolyte or a water-insoluble medium may be used as the electrolyte.

The crosslinked three-dimensional polymer of each of the first conductive layer 110 and the second conductive layer 130 may be formed using a transparent polymer network. The polymer network is transparent and is elastic and has ionic conductivity.

Further, each of the first conductive layer 110 and the second conductive layer 130 may be formed in a form of a hydrogel composed of a three-dimensional polymer network containing therein a large amount of moisture. In this connection, the polymer network may include polyacrylic acid, poly N-isopropylacrylamide (PNIPA), poly hydroxy ethyl methacrylate (PHEPA), polyethylene glycol (PEG), polyvinyl alcohol (PVA), and the like. Alternatively, each of the first conductive layer 110 and the second conductive layer 130 may be composed of a hydrogel formed using ion-crosslinked alginate and co-crosslinked polyacrylamide.

The first dielectric elastomer layer 120 may be made of various materials having high dielectric and elasticity. For example, the first dielectric elastomer layer 120 may be composed of at least one selected from a group consisting of silicone rubber, acrylonitrile-butadiene rubber (NBR), hydrogenated acrylonitrile butadiene rubber (H-NBR), ethylene propylene diene rubber (EPDM), acrylic rubber, urethane rubber, epichlorohydrin rubber, chlorosulfonated polyethylene, chlorinated polyethylene, and compounds thereof.

The first conductive layer 110, the second conductive layer 130 and the first dielectric elastomer layer 120 constitutes the sound member S. That is, the first dielectric elastomer layer 120 generates electrostriction as voltage is applied to the first conductive layer 110 and the second conductive layer 130, thereby to generate sound. The electrostriction is caused by Maxwell stress which is generated from the first dielectric elastomer layer 120 as the voltage is applied thereto.

As shown in FIG. 1, when the voltage is applied to the first conductive layer 110 and the second conductive layer 130 sandwiching the first dielectric elastomer layer 120 therebetween, static electricity is generated in the first dielectric elastomer layer 120 due to opposite charges. Thus, due to the Maxwell stress, an attractive force acts in a z direction to compress the first dielectric elastomer layer 120 such that the first dielectric elastomer layer 120 expands in a x-y direction. As the voltage applied to the first conductive layer 110 and the second conductive layer 130 increases, the first dielectric elastomer layer 120 is more compressed due to increased stress such that the layer 120 further expands in the x-y direction. Conversely, when the voltage decreases, the stress decreases such that the first dielectric elastomer layer 120 returns to an original size thereof.

In this way, due to the expansion and contraction of the first dielectric elastomer layer 120, the sound may be generated from the first dielectric elastomer layer 120. Thus, the combination of the first conductive layer 110 and the second conductive layer 130 and the first dielectric elastomer layer 120 may act as the sound member S.

Although described later, an alternating current voltage having a high frequency $\lambda 1$ such as an audible frequency is applied to the sound member S.

Like the first dielectric elastomer layer 120, the second dielectric elastomer layer 140 may be made of various materials having high dielectric and elasticity. For example, the second dielectric elastomer layer 140 may be composed of at least one selected from a group consisting of silicone rubber, acrylonitrile-butadiene rubber (NBR), hydrogenated acrylonitrile butadiene rubber (H-NBR), ethylene propylene diene rubber (EPDM), acrylic rubber, urethane rubber, epichlorohydrin rubber, chlorosulfonated polyethylene, chlorinated polyethylene, and compounds thereof.

The second dielectric elastomer layer 140 may be made of the same material as that of the first dielectric elastomer layer 120, or may be made of a material different from that of the first dielectric elastomer layer 120.

The photonic crystal layer 150 is composed of a gel-type polymer material and beads filled in the polymer material. For example, the photonic crystal layer 150 may be composed of a hydroxyethyl methacrylate (HEMA) or a polydimethylsiloxane (PDMS) gel and beads filled therein. In this connection, the bead may be made of polycarbonate (PC), polystyrene (PS), silica ($SiO_2$), etc. A diameter of the bead may be in a range of 100 to 280 nm, and preferably 170 to 210 nm.

The second dielectric elastomer layer 140 and photonic crystal layer 150 constitute the optical member P. The optical member P may reflect light having a specific wavelength $\lambda 2$ in visible light incident from an outside, thereby to render a desired color.

The color rendering from the optical member P is as follows.

As shown in FIG. 1, when voltage is applied to the first conductive layer 110 and the second conductive layer 130, an attractive force in the z direction due to Maxwell stress acts to compress the second dielectric elastomer layer 140 such that the second dielectric elastomer layer 140 expands in the x-y direction. As the second dielectric elastomer layer 140 expands in the x-y direction, the photonic crystal layer 150 bonded with the second dielectric elastomer layer 140 also expands in the x-y direction.

Figure 2:
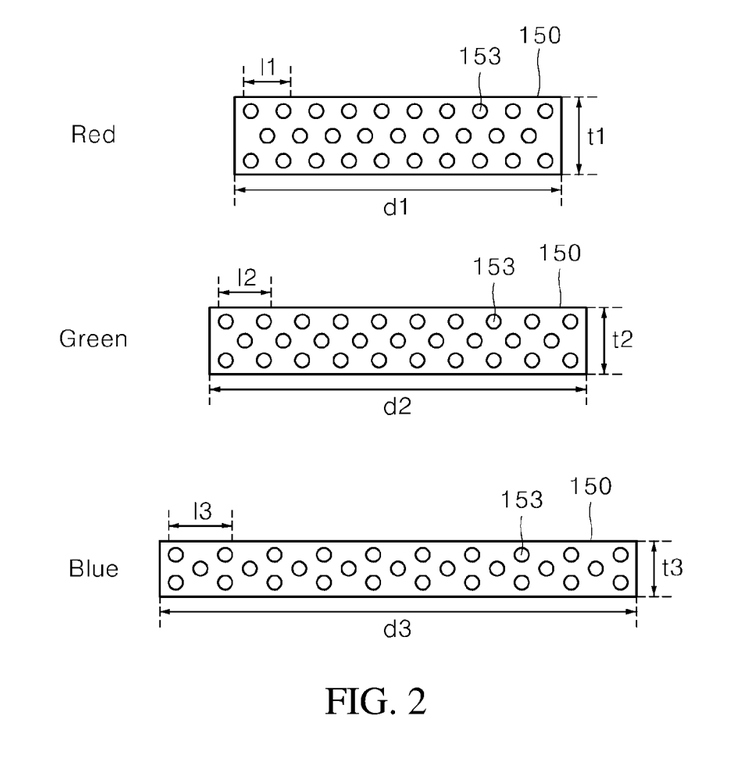
FIG. 2 shows colors displayed from a photonic crystal layer of an optical device according to the present disclosure when voltage is applied thereto.

As shown in FIG. 2, the beads 153 filled in the photonic crystal layer 150 are regularly arranged in a lattice manner to form a photonic crystal structure. When visible light enters the inside of the photonic crystal structure from the outside, the light is reflected from the beads 153. In this connection, light of the wavelength $\lambda 2$ which is equal to a spacing between adjacent beads 153 have constructive interference, whereas light of wavelengths other than $\lambda 2$ have destructive interference. Thus, only the light of the wavelength $\lambda 2$ is reflected while the light of wavelengths other than $\lambda 2$ are extinguished.

As shown in FIG. 2, when a relatively low level direct current voltage V1 is applied across the first conductive layer 110 and the second conductive layer 130, a thickness T1 of the photonic crystal layer 150 is relatively larger, and an area D1 thereof is relatively small, and a spacing L1 between beads 53 is relatively small. Therefore, in the photonic crystal layer 150, only color light corresponding to a long-wavelength, for example, red light has constructive interference and thus is reflected, whereas light of wavelengths other than the long-wavelength have destructive interference and thus are extinguished. Thus, a red color is rendered from the photonic crystal layer 150.

Further, when a middle level direct current voltage V2 (V2>V1) is applied across the first conductive layer 110 and the second conductive layer 130, a thickness T2 of the photonic crystal layer 150 decreases (T2>T1), an area D2 thereof increases (D2>D1), and a spacing L2 between beads 53 increases (L2>L1). Therefore, in the photonic crystal layer 150, only middle wavelength light, for example, green light has constructive interference and thus is reflected, whereas light of wavelengths other than the middle-wavelength have destructive interference and thus are extinguished. Thus, the green color is rendered from the photonic crystal layer 150.

Further, when a relatively high level direct current voltage V3 (V3>V2>V1) is applied across the first conductive layer 110 and the second conductive layer 130, a thickness T3 of the photonic crystal layer 150 is further reduced (T3<T2<T1), an area D3 thereof is further increased (D3>D2>D1), and a spacing L3 between beads 53 is further increased (L3>L2>L1). Therefore, in the photonic crystal layer 150, only short wavelength light, for example, blue light has constructive interference and thus is reflected, whereas light of wavelengths other than the short-wavelength have destructive interference and thus are extinguished. Thus, the blue color is rendered from the photonic crystal layer 150.

As described above, the optical device 100 according to the present disclosure outputs the sound from the sound member S and outputs the color, that is, an image from the optical member P such that the sound and the image may be concurrently output from the single optical device.

In this connection, the sound member S is activated by an alternating current voltage having a wavelength $\lambda 1$ similar to the audible frequency. The optical member P is activated by a direct current voltage having a set intensity V1, V2, and V3. The sound member S and the optical member P operate sequentially within one frame of the optical device 100, so that a user watching the optical device 100 may simultaneously enjoy the sound and the image.

Figure 3:
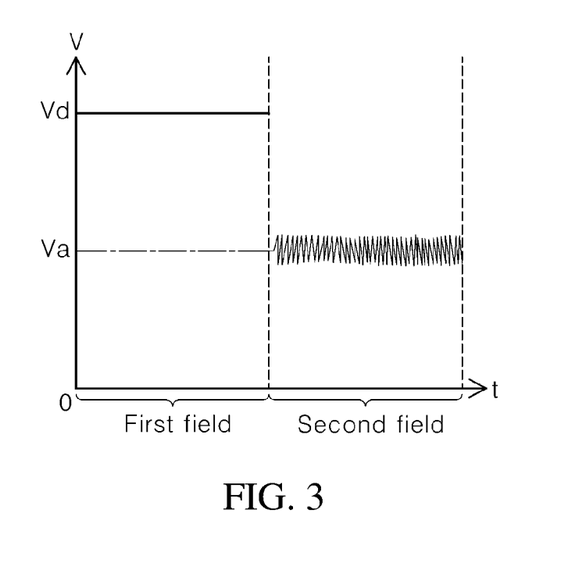
FIG. 3 shows a signal applied to an optical device according to the present disclosure.

FIG. 3 is a view showing a signal applied to the optical device 100 according to the first embodiment of the present disclosure. As shown in FIG. 3, a unit frame of the optical device 100 is composed of two fields. Direct current voltage Vd is applied in a first field and alternating current voltage Va is applied in a second field. The direct current voltage Vd is an image signal including image information displayed on the optical device 100, and the alternating current voltage Va is a sound signal including sound information output from the optical device 100.

In one example, in the drawing, the direct current voltage is applied in the first field and the alternating current voltage is applied in the second field. However, in another example, the alternating current voltage may be applied in the first field, and the direct current voltage may be applied in the second field. Further, in the drawing, the first field and the second field are set to have substantially the same period. However, in another example, the first field and the second field may have different time durations as needed.

As the signal is applied to the optical device 100, the sound signal and the image signal are applied to the sound member S and the optical member P, respectively, within the unit frame. Thus, the sound is output and the image is displayed within the unit frame, such that the user may simultaneously enjoy the sound and the image.

In this way, in the optical device according to the present disclosure, the sound and the image are simultaneously implemented using a single signal, thereby preventing defects as caused by the mismatch between the sound and the image.

Figure 4:
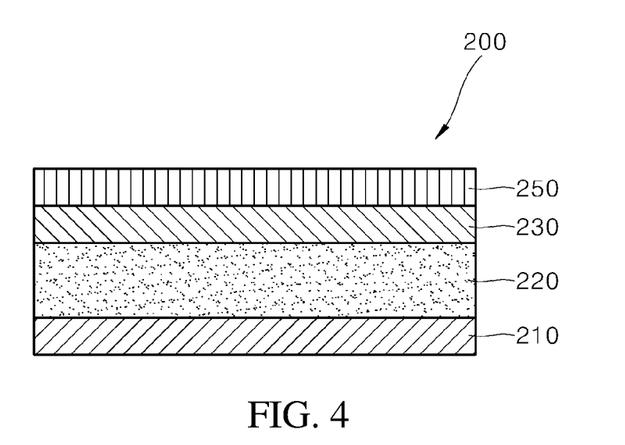
FIG. 4 is a view showing a structure of an optical device according to a second embodiment of the present disclosure.

FIG. 4 is a view showing a structure of an optical device 200 according to a second embodiment of the present disclosure.

As shown in FIG. 4, the optical device 200 having this structure includes a first conductive layer 210, a second conductive layer 230, a dielectric elastomer layer 220 disposed between the first conductive layer 210 and the second conductive layer 230, and a photonic crystal layer 250 disposed on the second conductive layer 230. The optical device 200 having this structure is similar to the optical device 100 shown in FIG. 1 except for a difference that the second dielectric elastomer layer 140 is not provided in the optical device 200.

Each of the first conductive layer 210 and the second conductive layer 230 may be composed of a crosslinked three-dimensional polymer which be formed using a transparent polymer network. Alternatively, each of the first conductive layer 210 and the second conductive layer 230 may be formed in a form of a hydrogel composed of a three-dimensional polymer network containing therein a large amount of moisture.

The dielectric elastomer layer 220 may be formed of a variety of materials having high dielectric property and elasticity which may include at least one selected from a group consisting of silicone rubber, acrylonitrile-butadiene rubber (NBR), hydrogenated acrylonitrile butadiene rubber (H-NBR), ethylene propylene diene rubber (EPDM), acrylic rubber, urethane rubber, epichlorohydrin rubber, chlorosulfonated polyethylene, chlorinated polyethylene, and compounds thereof.

The photonic crystal layer 250 is composed of a gel polymer material and beads filled in the polymer material. Further, the photonic crystal layer 250 may include a dielectric elastomer material which may be included in the dielectric elastomer layer 220. When, as described above, the dielectric elastomer material is included in the photonic crystal layer 250, the photonic crystal layer 250 itself has dielectric and elastic properties. Therefore, in the optical device 200 in this embodiment, Maxwell stress is generated from the photonic crystal layer 250 itself via voltage application, without a separate dielectric elastomer layer between the second conductive layer 230 and the photonic crystal layer 250. Thus, due to the Maxwell stress, the photonic crystal layer 250 expands in the x-y direction to reflect light of a desired wavelength.

Figure 5:
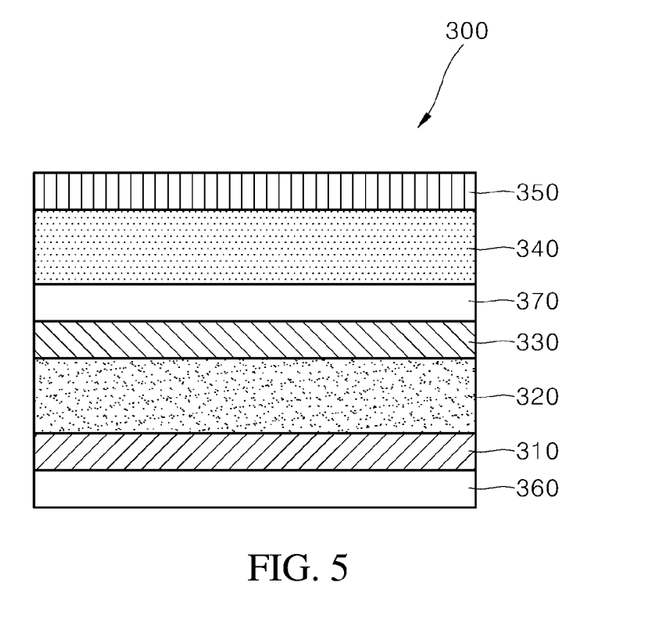
FIG. 5 is a view showing a structure of an optical device according to a third embodiment of the present disclosure.

FIG. 5 is a view showing a structure of an optical device 300 according to a third embodiment according to the present disclosure. Since the optical device 300 in this embodiment has a similar configuration to that of the optical device 100 in the first embodiment shown in FIG. 1, the description of the same structure is omitted and only a difference therebetween is described.

As shown in FIG. 5, the optical device 300 in this embodiment includes a first electrode 360 and a second electrode 370 disposed on a bottom face of a first conductive layer 310 and a top face of a second conductive layer 330, respectively. Each of the first electrode 360 and the second electrode 370 may be made of a transparent metal oxide such as ITO (Indium Tin Oxide) or IZO (Indium Zinc Oxide), or may be made of a metal such as Ag, Au, Cu, Al, or Ni.

Thus, in this embodiment, directly contacting the first conductive layer 310 and the second conductive layer 330 with the first electrode 360 and the second electrode 370 having low resistance, respectively may allow prevention of delay of a signal applied to the first dielectric elastomer layer 320 and the second dielectric elastomer layer 340.

Figure 6A:
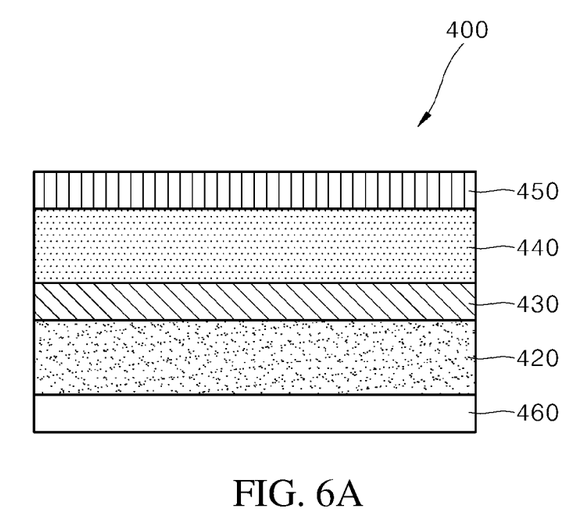
FIG. 6A and FIG. 6B are views showing a structure of an optical device according to a fourth embodiment of the present disclosure.
Figure 6B:
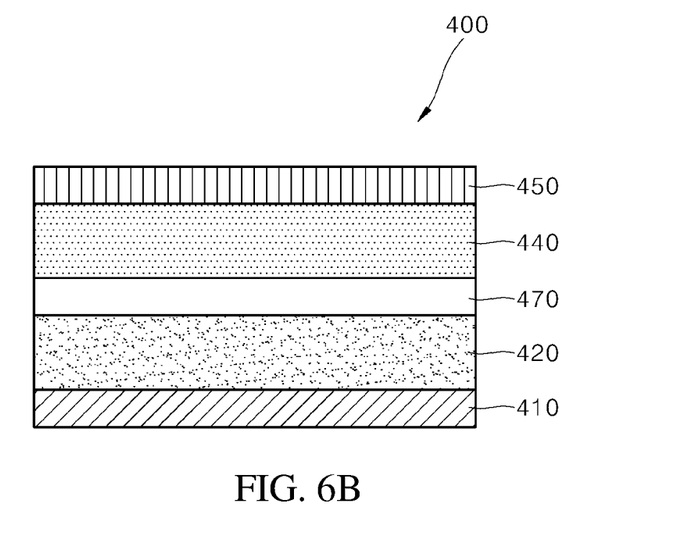

FIG. 6A and FIG. 6B are views showing a structure of an optical device 400 according to a fourth embodiment according to the present disclosure. Since the optical device 400 in this embodiment has a similar configuration to that of the optical device 100 in the first embodiment shown in FIG. 1, the description of the same structure is omitted and only a difference therebetween is described.

As shown in FIG. 6A, in the optical device 400 in this embodiment, a conductive layer 430 and an electrode 460 are disposed on top and bottom faces of a first dielectric elastomer layer 420, respectively. In this connection, the electrode 460 may be composed of a transparent metal oxide or metal, and the conductive layer 430 may be composed of a crosslinked three-dimensional polymer.

As shown in FIG. 6B, in the optical device 400 in this embodiment, an electrode 470 and a conductive layer 410 are disposed on top and bottom faces of the first dielectric elastomer layer 420, respectively. In this connection, the electrode 470 may be composed of a transparent metal oxide or metal, and the conductive layer 410 may be composed of a crosslinked three-dimensional polymer.

As described above, in the optical device according to the present disclosure, the sound member and the optical member are stacked vertically. Sound information and image information are included in a signal of one frame. Therefore, not only a desired color or image be displayed on a surface of one optical device, but also sound is output from the surface of the optical device. Therefore, the image and the sound are simultaneously implemented, thereby to prevent defects due to mismatch between the image and the sound.

Further, the optical device according to the present disclosure does not need to have a sound system separate from the optical device in order to output the sound. Thus, when the display device is manufactured using the optical device, the separate sound system is not required, thereby reducing the number of parts of an electronic product including the display device and reduce a manufacturing cost thereof.

Moreover, when applying the optical device according to the present disclosure to the display device, the sound is not output from the point sound source but is output across an entire screen of the display device, such that true stereo sound may be realized.

Hereinafter, a display device equipped with the above optical device will be described in detail.

Figure 7:
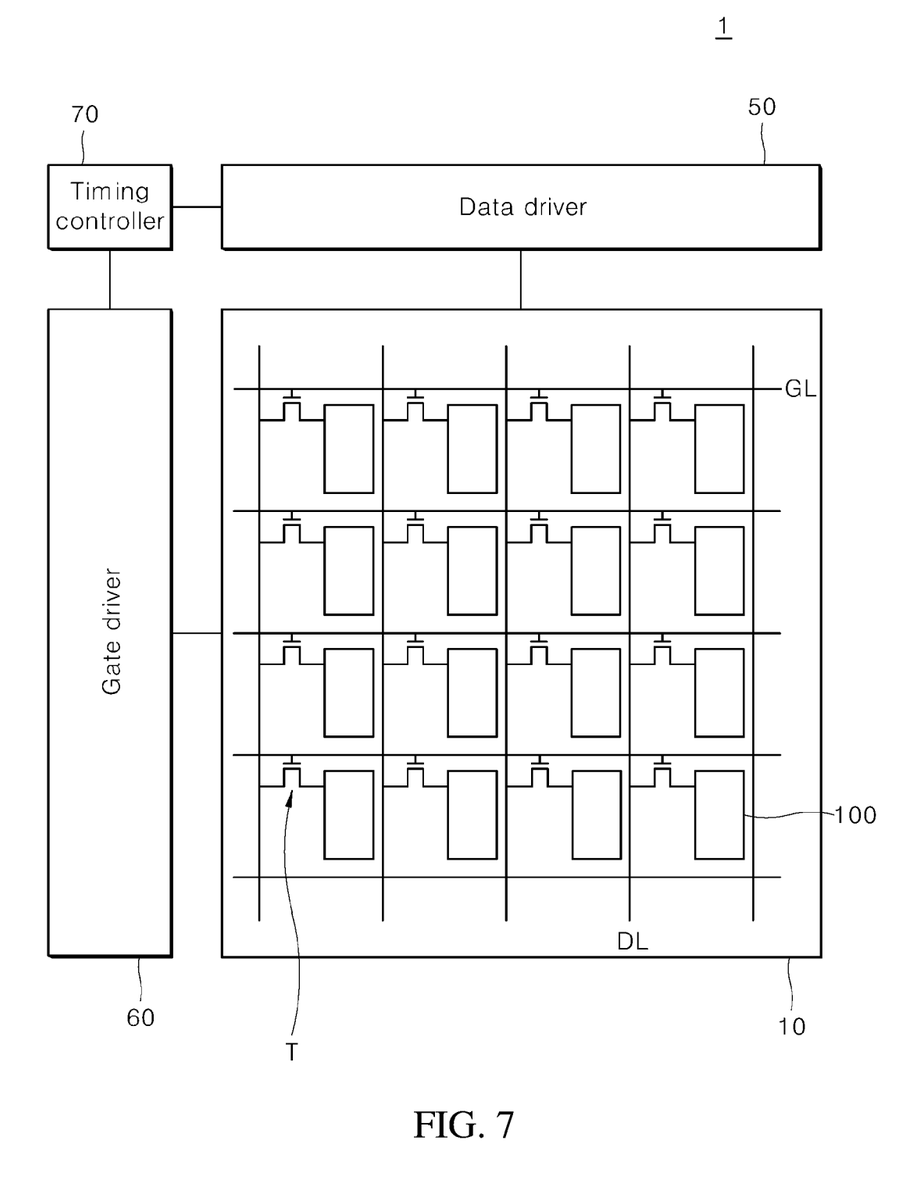
FIG. 7 shows a structure of a display device according to the present disclosure.

FIG. 7 is a view showing a display device equipped with an optical device according to the present disclosure.

As shown in FIG. 7, a display device 1 according to the present disclosure includes a display panel 10, a data driver 50, a gate driver 60, and a timing controller 70.

In the display panel 10, a plurality of gate lines GL and a plurality of data lines DL that are perpendicular to each other and are arranged in a matrix form. A pixel is defined in a crossing area between the gate line GL and the data line DL. A thin film transistor T is formed in each pixel. An optical device 100 controlled by the thin film transistor T is disposed in each pixel to display a screen.

The thin film transistor T is turned on when a scan signal from the gate line GL, that is, a high potential gate voltage is applied thereto, thereby to apply a signal supplied from the data line DL to the optical device 100. Further, the thin film transistor T is turned off when a low potential gate voltage is applied from the gate line GL thereto so that data voltage charged in the optical device 100 is maintained for one frame.

The gate driver 60 is placed at one end of the display panel 10, and is electrically connected to the gate line GL formed on the display panel 10, and outputs a gate driving signal sequentially on a horizontal line basis.

The gate driver 60 turns on the thin film transistor T disposed on the display panel 10 in response to reception of a gate control signal GCS applied from the timing controller 70. Accordingly, a signal supplied from the data driver 50 is applied to the optical device 100 connected to each thin film transistor T.

The gate control signal GCS includes a gate start pulse GSP, a gate shift clock GSC, and a gate output enable GOE.

The data driver 50 aligns input signals in response to reception of data control signals input from the timing controller 70 and receives a gamma reference voltage GMA from a gamma reference voltage generator (not shown) and converts the GMA into an analog data voltage corresponding to the signal. In this connection, the input signal includes the sound information and the image information. The converted data voltage includes alternating current voltage corresponding to the sound information and direct current voltage corresponding to the image information.

The data control signal DCS includes a source start pulse SSP, a source shift clock SSC, and a source output enable SOE. In this connection, the source start pulse SSP is a signal to control a start timing of data sampling of the data driver 50. The source shift clock SSC is a clock signal that controls a sampling timing of data in each driving IC constituting the data driver 50 in a corresponding manner to a rising edge or a falling edge. Further, the source output enable SOE controls an output timing of the data driver 50.

The optical device 100 is disposed in each pixel. The optical device 100 has the sound member and the optical member to be able to output the sound simultaneously with displaying of the image. The optical device 100 displays R (Red), G (Green), and B (Blue) colors. The optical devices 100 are regularly arranged within the display panel 10 to realize a desired image.

Figure 8:
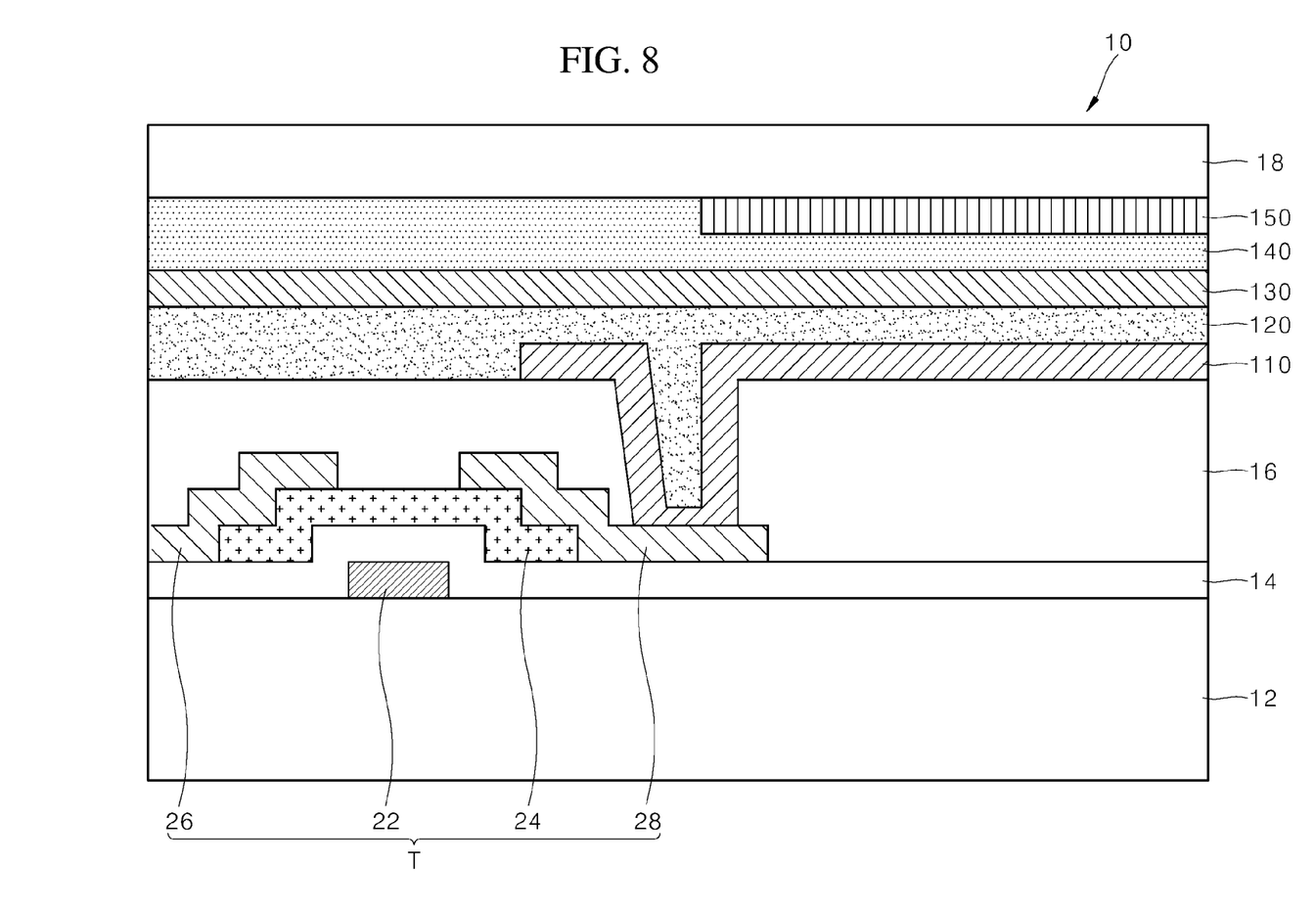
FIG. 8 is a cross-sectional view showing a structure of a pixel in FIG. 7.

FIG. 8 is a diagram showing a structure of one pixel shown in FIG. 7, and shows a structure of the optical device 100 and a structure of the thin film transistor T in the pixel. In this connection, for example, the optical device 100 having a structure shown in the first embodiment of FIG. 1 is shown. However, the present disclosure is not limited to this structure. The optical devices 100 in the first to fourth embodiments may be applied.

As shown in FIG. 8, the thin film transistor T is disposed on a transparent first substrate 12. The thin film transistor T includes a gate electrode 22 formed on each of R, G, and B pixels on the first substrate 12, a gate insulating layer 14 formed over an entirety of the first substrate 12 on which the gate electrode 22 is formed, a semiconductor layer 24 formed on the gate insulating layer 14, and a source electrode 26 and a drain electrode 28 formed on the semiconductor layer 24.

The first substrate 12 may be composed of a soft and transparent plastic material. Further, the gate electrode 22 may be made of a metal such as Cr, Mo, Ta, Cu, Ti, Al or Al alloy. The gate insulating layer 14 may be formed of a single layer made of an inorganic insulating material such as $SiO_2$ or $SiN_x$ or of a stack of double layers respectively made of $SiO_2$ and $SiN_x$.

The semiconductor layer 24 is made of amorphous silicon or crystalline silicon, or a transparent oxide semiconductor such as IGZO (Indium Gallium Zinc Oxide). Further, each of the source electrode 26 and the drain electrode 28 may be made of Cr, Mo, Ta, Cu, Ti, Al or Al alloy.

A protective layer 16 made of an organic insulating material such as photoacrylic is laminated on the first substrate 12 on which the thin film transistor T is formed. The optical device 100 is disposed on the protective layer 16.

The optical device 100 includes the first conductive layer 110 disposed on the protective layer 16 and electrically connected to the drain electrode 28 of the thin film transistor T via a contact hole formed in the protective layer 16, the first dielectric elastomer layer 120 disposed on the first conductive layer 110, the second conductive layer 130 disposed on the first dielectric elastomer layer 120, the second dielectric elastomer layer 140 disposed on the second conductive layer 130, and the photonic crystal layer 150 disposed on the second dielectric elastomer layer 140.

The first conductive layer 110, the first dielectric elastomer layer 120, the second conductive layer 130, the second dielectric elastomer layer 140 and the photonic crystal layer 150 are identical with those of the optical device of the first embodiment shown in FIG. 1. The first conductive layer 110, the first dielectric elastomer layer 120, and the second conductive layer 130 constitute the sound member, while the second dielectric elastomer layer 140 and the photonic crystal layer 150 constitute the optical member.

A second substrate 18 is disposed on the optical device. The second substrate 18 may be made of a transparent and flexible material, such as a plastic film.

Although not shown in the drawings, the second dielectric elastomer layer 140 may be removed from the display panel 10 according to the present disclosure. In this case, the photonic crystal layer 150 may include a transparent elastomer material included in the second dielectric elastomer layer 140.

Further, the first electrode and the second electrode made of a transparent metal oxide or metal may be additionally disposed between the first conductive layer 110 and the protective layer 16 and on top of the second conductive layer 130, respectively.

In addition, at least one of the first conductive layer 110 and the second conductive layer 130 may be replaced with an electrode made of a transparent metal oxide or metal.

Referring back to FIG. 7, in the display device according to the present disclosure, the optical device composed of the sound member and the optical member may be disposed in each of the plurality of pixels of the display panel 10. The optical devices may be activated by applying the signal including the sound information and the image information to the plurality of optical devices.

Figure 9:
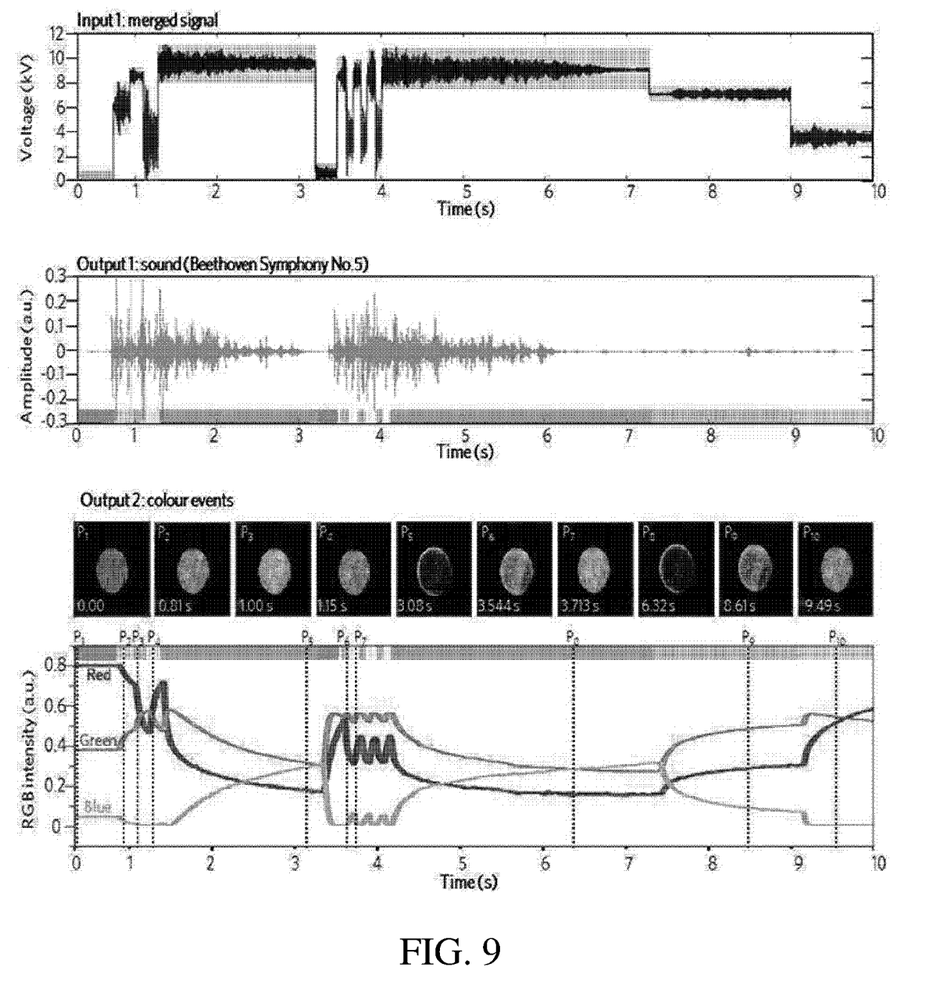
FIG. 9 is a view showing a signal applied from a display device to an optical device according to the present disclosure.

FIG. 9 is a diagram showing a signal Input generated by the data driver 50 and outputs Output1 and Output2 corresponding to the signal Input in the display device according to the present disclosure.

As shown in FIG. 9, the generated signal includes the sound information and the image information. The sound information may be composed of the alternating current voltage and the image information may be composed of the direct current voltage. In this connection, the alternating current voltage and the direct current voltage are applied in the first field and the second field of the signal of one frame respectively, so that the sound and the image may be simultaneously output within one frame.

Further, R, G, and B pixels of the display panel 10 form one image. The sound corresponding to this image is output from the corresponding R, G, and B pixels, so that the image and the sound are output at the same position, and thus the image and the sound may be perfectly matched with each other.

For example, in accordance with the present disclosure, when a vehicle implements an image that moves from one side to the other side on a screen, an area on which the sound is output may move in the same way as movement of the vehicle, that is, an area on which an image of the vehicle is displayed, thereby outputting sound of an actual exhaust gas from the moving vehicle.

What is claimed is:

1. An optical device comprising:
a first electrode member;
a first dielectric elastomer layer disposed on the first electrode member;
a second electrode member disposed on the first dielectric elastomer layer; and
a photonic crystal layer disposed on the second electrode member,
wherein both of the first dielectric elastomer layer and the photonic crystal layer are driven by applying a signal to the first electrode member and the second electrode member such that a thickness of the first dielectric elastomer layer and a thickness of the photonic crystal layer change responsive to the signal applied to the first electrode member and the second electrode member, and
wherein the first dielectric elastomer layer and the photonic crystal layer are driven sequentially within a same frame of the signal such that light corresponding to an image is output by the photonic crystal layer and sound corresponding to the image is output by the first dielectric elastomer layer responsive to the thickness of the first dielectric elastomer layer and the thickness of the photonic crystal layer changing.

2. The optical device of claim 1, wherein the first electrode member includes at least one of a first conductive layer or a first electrode.

3. The optical device of claim 2, wherein the second electrode member includes at least one of a second conductive layer or a second electrode.

4. The optical device of claim 3, wherein each of the first conductive layer and the second conductive layer includes:
an elastomer or conductive polymer; and
an electrolyte contained in the elastomer or the conductive polymer.

5. The optical device of claim 3, wherein each of the first electrode and the second electrode is made of a transparent metal oxide or metal.

6. The optical device of claim 1, further comprising a second dielectric elastomer layer disposed between the second electrode member and the photonic crystal layer.

7. The optical device of claim 6, wherein each of the first dielectric elastomer layer and the second dielectric elastomer layer includes a material selected from a group consisting of silicone rubber, acrylonitrile-butadiene rubber NBR, hydrogenated acrylonitrile butadiene rubber (H-NBR), ethylene propylene diene rubber EPDM, acrylic rubber, urethane rubber, epichlorohydrin rubber, chlorosulfonated polyethylene, chlorinated polyethylene, and compounds thereof.

8. The optical device of claim 1, wherein the photonic crystal layer includes:
a polymer material in a form of a gel; and
beads filled in the polymer material.

9. The optical device of claim 1, wherein the photonic crystal layer includes:
a dielectric and elastic material; and
beads filled in the dielectric and elastic material.

10. The optical device of claim 1, wherein the first electrode member, the first dielectric elastomer layer, and the second electrode member constitute a sound member for outputting the sound, while the photonic crystal layer constitutes an optical member to reflect light to display the image.

11. The optical device of claim 10, wherein one frame of the signal applied to the first electrode member and the second electrode member includes a first field including sound information and a second field including image information.

12. The optical device of claim 11, wherein alternating current voltage is applied in the first field of one frame of the signal and direct current voltage is applied in the second field thereof.

13. A display device comprising:
a plurality of pixels;
a thin film transistor disposed in each of the plurality of pixels; and
an optical device disposed in each of the plurality of pixels and electrically connected to the thin film transistor,
wherein the optical device includes:
a first electrode member;
a first dielectric elastomer layer disposed on the first electrode member;
a second electrode member disposed on the first dielectric elastomer layer; and
a photonic crystal layer disposed on the second electrode member,
wherein both of the first dielectric elastomer layer and the photonic crystal layer are driven by applying a signal to the first electrode member and the second electrode member such that a thickness of the first dielectric elastomer layer and a thickness of the photonic crystal layer change responsive to the signal applied to the first electrode member and the second electrode member, and
wherein the first dielectric elastomer layer and the photonic crystal layer are driven sequentially within a same frame of the signal such that light corresponding to an image is output by the photonic crystal layer and sound corresponding to the image is output by the first dielectric elastomer layer responsive to the thickness of the first dielectric elastomer layer and the thickness of the photonic crystal layer changing.

14. The display device of claim 13, wherein the first electrode member, the first dielectric elastomer layer, and the second electrode member constitute a sound member configured to output sound.

15. The display device of claim 13, wherein the photonic crystal layer includes:
   a polymer material in a form of a gel; and
   beads filled in the polymer material.

16. The display device of claim 13, wherein the photonic crystal layer includes:
   a dielectric and elastic material; and
   beads filled in the dielectric and elastic material.

* * * * *